US012606262B2

(12) United States Patent
Kobayashi et al.

(10) Patent No.: US 12,606,262 B2
(45) Date of Patent: Apr. 21, 2026

(54) STRADDLE VEHICLE AND DETECTING STRUCTURE

(71) Applicant: KAWASAKI MOTORS, LTD., Akashi (JP)

(72) Inventors: Mitsuru Kobayashi, Akashi (JP); Shinji Ikeda, Akashi (JP)

(73) Assignee: KAWASAKI MOTORS, LTD., Akashi (JP)

( * ) Notice: Subject to any disclaimer, the term of this patent is extended or adjusted under 35 U.S.C. 154(b) by 435 days.

(21) Appl. No.: 18/180,571

(22) Filed: Mar. 8, 2023

(65) Prior Publication Data

US 2024/0300602 A1    Sep. 12, 2024

(51) Int. Cl.
| | |
|---|---|
| *B62J 17/02* | (2006.01) |
| *B62J 17/10* | (2020.01) |
| *B62J 45/41* | (2020.01) |
| *B62J 45/42* | (2020.01) |
| *B62J 6/022* | (2020.01) |
| *B62J 41/00* | (2020.01) |

(52) U.S. Cl.
CPC .............. *B62J 17/02* (2013.01); *B62J 17/10* (2020.02); *B62J 45/41* (2020.02); *B62J 45/42* (2020.02); *B62J 6/022* (2020.02); *B62J 41/00* (2020.02)

(58) Field of Classification Search
CPC ... B62J 17/02; B62J 17/10; B62J 45/41; B62J 41/00; B62J 6/022
USPC ....................................................... 296/78.1
See application file for complete search history.

(56) References Cited

U.S. PATENT DOCUMENTS

| | | | | |
|---|---|---|---|---|
| 11,518,465 | B2 * | 12/2022 | Neuman | ..................... B62J 6/26 |
| 11,628,900 | B2 * | 4/2023 | Yamamoto | ........... B60Q 1/0094 |
| | | | | 362/475 |
| 2007/0086203 | A1 * | 4/2007 | Nakano | ..................... B62J 6/023 |
| | | | | 362/514 |
| 2017/0001674 | A1 * | 1/2017 | Ishii | .......................... B62J 6/022 |
| 2020/0017164 | A1 | 1/2020 | Saeki | |
| 2020/0361554 | A1 * | 11/2020 | Kumasaka | ............... B62J 50/22 |
| 2021/0061395 | A1 * | 3/2021 | Koga | ........................ H01Q 1/52 |
| 2021/0188384 | A1 * | 6/2021 | Saeki | ........................ B62J 11/00 |
| 2021/0188385 | A1 * | 6/2021 | Saeki | ........................ B62J 45/00 |

FOREIGN PATENT DOCUMENTS

| | | | | |
|---|---|---|---|---|
| DE | 10217220118 | | 5/2019 | |
| EP | 1143259 | | 10/2001 | |
| EP | 3243731 | A1 * | 11/2017 | ........... B60Q 1/0023 |
| EP | 3453600 | A1 * | 3/2019 | .............. B62J 45/41 |
| EP | 3838726 | A1 * | 6/2021 | .............. B62J 11/00 |
| EP | 3838728 | A1 * | 6/2021 | .............. B62J 11/00 |
| JP | 2019-048554 | A | 3/2019 | |
| JP | 2020-006876 | | 1/2020 | |
| JP | 2021041930 | | 3/2021 | |
| JP | 2021-095060 | | 6/2021 | |
| WO | WO-2017221410 | A1 * | 12/2017 | .............. B60R 1/12 |

(Continued)

*Primary Examiner* — Hilary L Gutman

(74) *Attorney, Agent, or Firm* — Fay Kaplun & Marcin, LLP

(57) ABSTRACT

A motorcycle includes a radar device and a radar cover. The radar device is arranged below a front end portion of a vehicle body and includes a signal surface for wirelessly transmitting signals to a front area or wirelessly receiving signals from the front area. The radar device detects the front area. The radar cover covers at least the signal surface.

15 Claims, 6 Drawing Sheets

(56)     References Cited

FOREIGN PATENT DOCUMENTS

| WO | WO-2019167220 A1 * | 9/2019 | ................ B62J 1/28 |
| WO | WO-2019180941 A1 * | 9/2019 | .............. B62J 17/02 |
| WO | 2019/224961 | 11/2019 | |

* cited by examiner

STRADDLE VEHICLE AND DETECTING STRUCTURE

FIELD OF ART

The present disclosure mainly relates to a straddle vehicle including a radar device for detecting a front area.

DESCRIPTION OF THE RELATED ART

Patent Document 1 is Japanese Patent Application Laid-Open No. 2019-48554. Patent Document 1 discloses a motorcycle including a radar device for detecting a front area. The radar device in the Patent Document 1 is arranged within a front cowling, between a windshield and a headlight.

SUMMARY

When a detecting device, such as a radar device, is arranged to the outside, a flying object or the like may strike a signal surface of the detecting device. The detecting device can be protected by covering it with a front cowling. However, in this case, the degree of freedom in designing an outer shape of the front cowling is reduced because the detecting device is accommodated in the front cowling. For example, the placement of the detecting device increases the outer shape of an upper portion of the front cowling, which may increase driving resistance and deteriorate aesthetics. Even if an element other than the front cowling is used to protect the detecting device, the degree of freedom in designing the outer shape may be similarly reduced.

The present disclosure relates to a straddle vehicle capable of protecting a detecting device from a flying object or the like while preventing a reduction in the degree of freedom in designing the outer shape of the straddle vehicle.

In accordance with an aspect of the present disclosure, a straddle vehicle having the following configuration is provided. That is, the saddle ride type vehicle includes a detecting device and a cover. The detecting device is arranged below a front end portion of a vehicle body, has a signal surface for wirelessly transmitting signals to a front area or wirelessly receiving signals from the front area, and detects the front area. The cover covers at least the signal surface.

According to the present disclosure, it is possible to provide a saddle ride type vehicle that can protect a detecting device from a flying object and the like while preventing a reduction in the degree of freedom in designing the outer shape of the straddle vehicle.

DETAILED DESCRIPTION

In the following, this embodiment is described with reference to the drawings. In the following description, a left-right direction of a motorcycle 1 is defined in a direction in which a rider sitting on the motorcycle 1, which corresponds to a straddle vehicle. A front-rear direction corresponds to a vehicle longitudinal direction, and the left-right direction corresponds to a vehicle width direction. A vertical direction corresponds to an up-down direction and a height direction.

Figure 1:
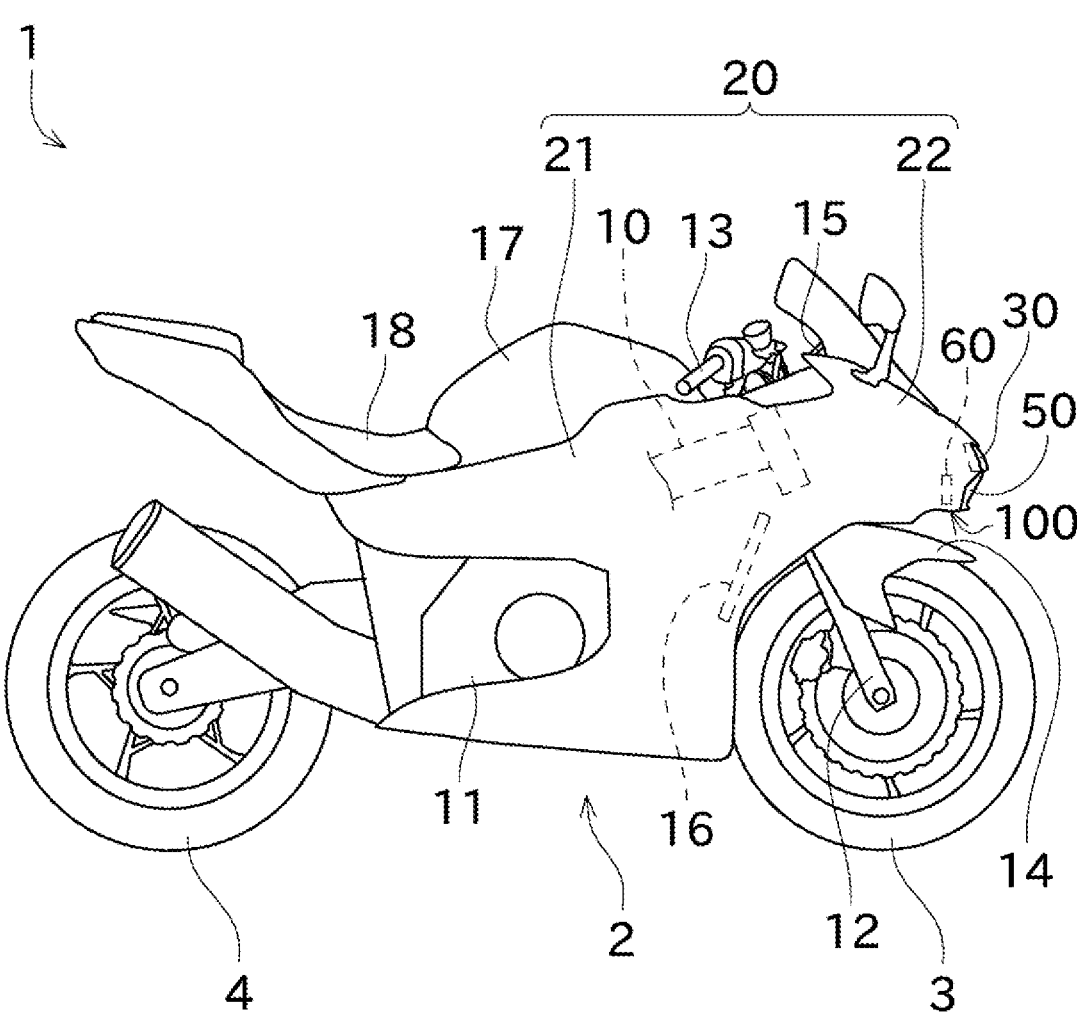
FIG. 1 is a side view of a motorcycle.
Figure 2:
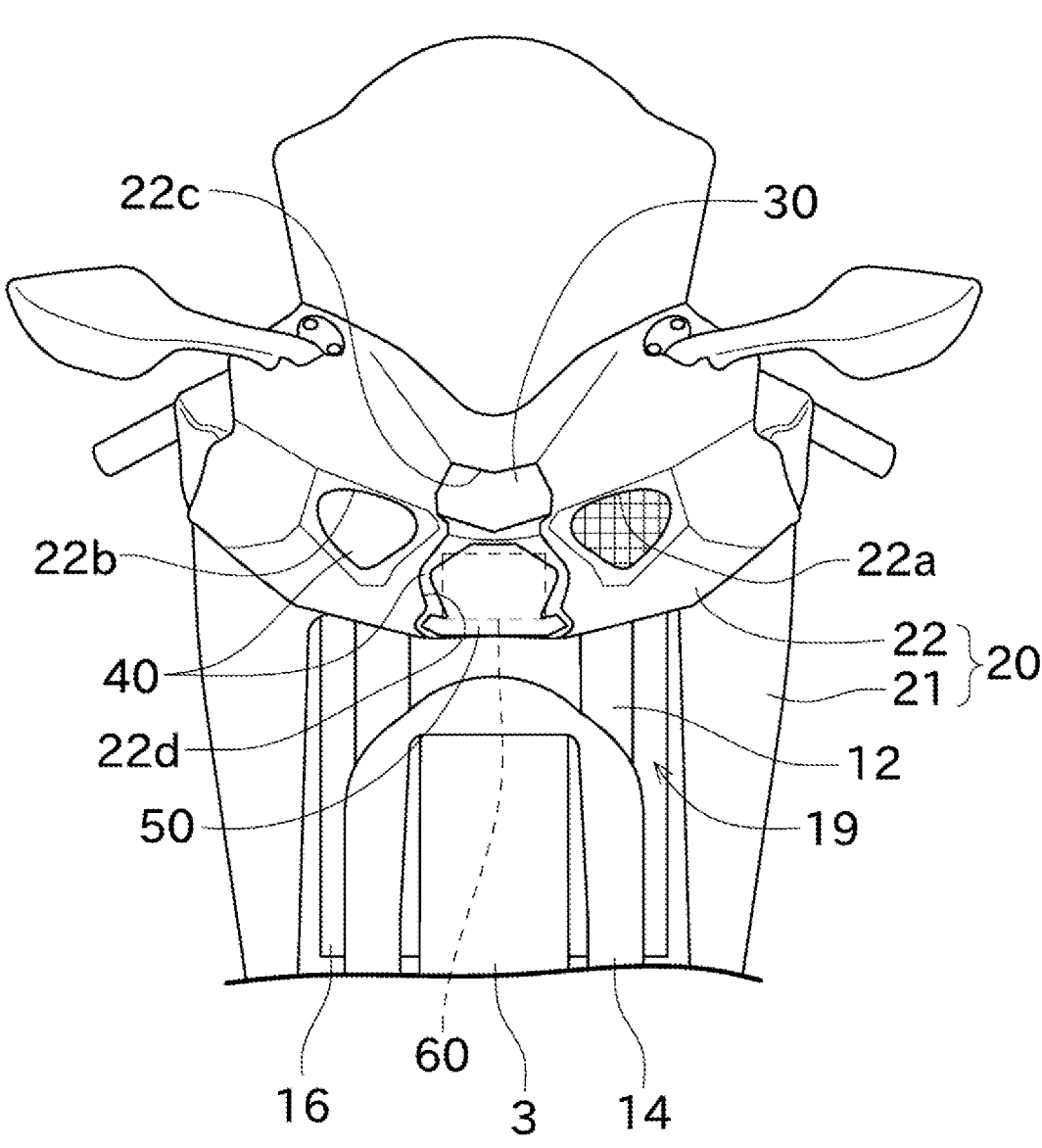
FIG. 2 is a front view of the motorcycle.

First, the motorcycle 1 is described in overview with reference to FIG. 1 and FIG. 2. FIG. 1 is a side view of the motorcycle 1. FIG. 2 is a front view of the motorcycle 1. As shown in FIG. 1, the motorcycle 1 includes a vehicle body 2, a front wheel 3, and a rear wheel 4.

The vehicle body 2 is a part of the motorcycle 1 that does not include the front wheel 3 and the rear wheel 4. The vehicle body 2 has a vehicle body frame 10 that forms a frame structure of the motorcycle 1. The vehicle body frame 10 includes a plurality of subframes, such as a head tube and a main frame. The vehicle body frame 10 supports various components forming the motorcycle 1.

The vehicle body frame 10 supports an engine 11. The engine 11 serves as a power source by which the motorcycle 1 is made to travel. The engine 11 according to this embodiment is a gasoline engine. It should be noted that instead of or in addition to the gasoline engine, another power source may be provided, such as an electric motor as a power source. An internal combustion engine other than the gasoline engine may be provided as a drive source. The driving force generated by the engine 11 is transmitted to the rear wheel 4 via a power transmission section, such as a drive chain. As a result, the motorcycle 1 travels.

A front fork 12, a steering handle 13 and a front fender 14 are arranged on a front part of the vehicle body 2. The front fork 12 is arranged as a left-right pair such that it clamps the front wheel 3 when viewed from the front. The front wheel 3 is fixed to the vehicle body 2 by the front fork 12. The steering handle 13 is connected to an upper end of the front fork 12. When the rider rotates the steering handle 13, the front fork 12 rotates and thereby the direction of travel of the motorcycle 1 can be changed. The front fender 14 covers a part of a side surface of the front wheel 3 and a part of an upper surface of the front wheel 3.

A meter device 15 is arranged near the center of the vehicle width direction in front of the steering handle 13. The meter device 15 can display the engine speed and the vehicle speed. In this embodiment, the meter device 15 can display detection results of a radar device 60, which will be described later.

A radiator 16 is arranged behind an upper section of the front wheel 3. Inside the radiator 16, a circulating fluid flows and circulates through the vehicle body 2. In particular, the circulating fluid is formed by cooling liquid for cooling the interior of the engine 11. Therefore, the circulating fluid circulates between the radiator 16 and the engine 11. The radiator 16 lowers the temperature of the circulating fluid by dissipating heat through air cooling. Heat dissipation by air cooling is used to lower the heat of an object by blowing air at it. In this embodiment, the temperature of the circulating fluid in the radiator 16 is lowered by traveling air generated when the motorcycle 1 is driven into the radiator 16.

Behind the steering handle 13 and above the engine 11 is a fuel tank 17 in which fuel is stored for supply to the engine 11. Behind the fuel tank 17 is arranged a seat 18 on which a rider can sit. When the rider sits on the seat 18, the rider clamps the fuel tank 17 and the area below it with a knee portion of his legs to stabilize his body and move the center of gravity to the left and right to perform a part of a steering operation or a vehicle body tilting operation. In this manner, the seated rider straddles the seat 18 with his legs so that the motorcycle 1 forms a saddle ride type vehicle. In addition, the motorcycle 1 is also a leaning type vehicle that can be swung by tilting the motorcycle 1.

A cowling 20 is provided on an outer surface of the motorcycle 1. The cowling 20 is made of a material that transmits electromagnetic waves of a frequency used for radar. The cowling 20 of this embodiment is made of resin. The cowling 20 is provided for the purpose of reducing the air resistance of the motorcycle 1, protecting respective components of the motorcycle 1, improving aesthetics, and the like.

The cowling 20 includes a side cowling 21 and a front cowling 22. The side cowling 21 is a part of the cowling 20 arranged as a left-right pair at the front portion and the lower portion of the motorcycle 1, and provided mainly at side surfaces of the motorcycle 1. The front cowling 22 is a part of the cowling 20 arranged at the front portion and the upper portion of the motorcycle 1, and provided mainly at a front surface of the motorcycle 1. The front portion of the motorcycle 1 is a portion located further forward than the center of the motorcycle 1 in the longitudinal direction of the vehicle, for example, a portion located forward of the seat 18.

For example, the front cowling 22 is streamlined or cannonball shape. A front end portion of the front cowling 22 is centered in the vehicle width direction. The front end portion of the front cowling 22 is arranged above an upper end position of the front wheel 3 and below a steering handle of the steering handle 13. The front cowling 22 has a portion that inclines smoothly from the front end portion with a smaller difference in level. Therefore, the outer shape of the front end portion of the front cowling 22 is smaller than the outer shape of the middle portion and the outer shape of the rear end portion of the front cowling 22. In other words, the shape of the front cowling 22 gradually expands from the front end portion rearward in the up-down direction and the vehicle width direction. The surface of the front cowling 22 is curved for the most part to reduce air resistance, but may have a linear shape in part. In this embodiment, the front portion of the vehicle body 2 mainly comprises the front cowling 22 and components attached to the front cowling 22. Therefore, the above description regarding the shape of the front end of the front cowling 22 may be read as a description of the shape of the front end of the vehicle body 2.

Next, with reference to FIG. 2, a radiator air inlet port 19 and front cowling 22 are described.

As shown in FIG. 2, the radiator air inlet port 19 is formed at the front of the motorcycle 1. The traveling air flowing in through the radiator air inlet port 19 (which is called ram-air) impinges on the radiator 16. The radiator air inlet port 19 is an intermediate space below the front cowling 22. More specifically, the radiator air inlet port 19 consists of an intermediate space encompassed by the side cowling 21 on the left and right sides in the vehicle width direction.

In this embodiment, the front portion of the front cowling 22 is formed with an engine air intake port 22a, a dummy hole 22b, a lamp hole 22c, and a radar hole 22d.

The engine air intake port 22a guides traveling air into the interior of the vehicle body 2. In particular, the engine air intake port 22a receives traveling air for supply to the engine 11. Therefore, a grille-shaped member is arranged in the engine air intake port 22a to prevent foreign matter from entering. The traveling air absorbed by the engine air intake port 22a is supplied to the engine 11. Thus, the intake pressure of the engine 11 can be increased. It should be noted that the structure for supplying airstream to the engine 11 may also be omitted.

When viewed from the front, the dummy hole 22b is arranged at a position opposite to the engine air intake port 22a with a center position in the vehicle width direction therebetween. The dummy hole 22b serves to balance the appearance with respect to the engine air intake port 22a, thereby making the appearance of the motorcycle 1 symmetrical on the left and right sides. The dummy hole 22b is closed by a cover bracket 40, which will be described later. It should be noted that the dummy hole 22b may be omitted.

A headlight 30 is mounted in the lamp hole 22c. The headlight 30 is always on, at least while the vehicle is moving, and illuminates the front area in front of the motorcycle 1. The headlight 30 according to this embodiment is arranged to overlap with the center position in the vehicle width direction. However, the headlight 30 may be formed by a plurality of lamps. In particular, a plurality of headlights 30 may be arranged side by side in the up-down direction at the center position in the vehicle width direction, or the headlight 30 may be arranged as a pair of left and right headlights with the center position in the vehicle width direction therebetween. When the headlight 30 is formed by a plurality of lamps, the front cowling 22 is formed with lamp holes 22c corresponding to the number and positions of the headlights 30.

In this embodiment, the headlight 30 is arranged in the center of the vehicle width direction. The headlight 30 is arranged above a front end position of the front cowling 22. An outer lens of the headlight 30 is formed with an inclined surface to direct the incident traveling air upward and rearward.

In this embodiment, the radar hole 22d is positioned in line with the lamp hole 22c in the up-down direction, and in particular is positioned below the lamp hole 22c. The cover bracket 40 is fixed in the radar hole 22d. A radar cover 50 is attached to the cover bracket 40. The cover bracket 40 and the radar cover 50 close the radar hole 22d. The radar device 60 is arranged at a position that overlaps the radar cover 50 when viewed from the front. The radar device 60 is arranged at a position overlapping with the center position in the vehicle width direction. The radar device 60 is arranged below the front end position of the front cowling 22. The radar device 60 is arranged further forward than the engine air intake port 22a, which is adjacent thereto in the vehicle width direction.

The radar device 60 transmits electromagnetic waves such as infrared rays, millimeter waves, or microwaves into an area in front of the radar device 60, and receives and analyzes electromagnetic waves reflected from an object. The electromagnetic waves emitted and received by the radar device 60 correspond to signals. The radar device 60 detects the direction of an object located in the area in front of the motorcycle 1, and the distance to the object. For example, a detection result of the radar device 60 is output to a control device that controls the motorcycle 1. Based on the presence or absence of an object in the front area and the distance to the object, the control device displays information about the object to the rider on the meter device 15 or reduces the engine power and activates the brakes to help avoid a collision with the object. It should be noted that the process based on the detection result of the radar device 60 is an example. Further, the process for displaying the detection result of the radar device 60 on the meter device 15 may be omitted. Similarly, the vehicle control based on the detection result of the radar device 60 may be omitted. The cover bracket 40, the radar cover 50, and the radar device 60 will be described in detail later. A structure in which the radar cover 50 and the radar device 60 are combined corresponds to a detecting structure 100.

The position of the radar hole 22*d* in this embodiment, that is, the position of the radar device 60, is an example and may be changed. For example, the radar device 60 may be disposed at a position that does not overlap with the center position in the vehicle width direction, that is, at a position that is offset in a direction in the vehicle width direction from the center position in the vehicle width direction.

Figure 3:
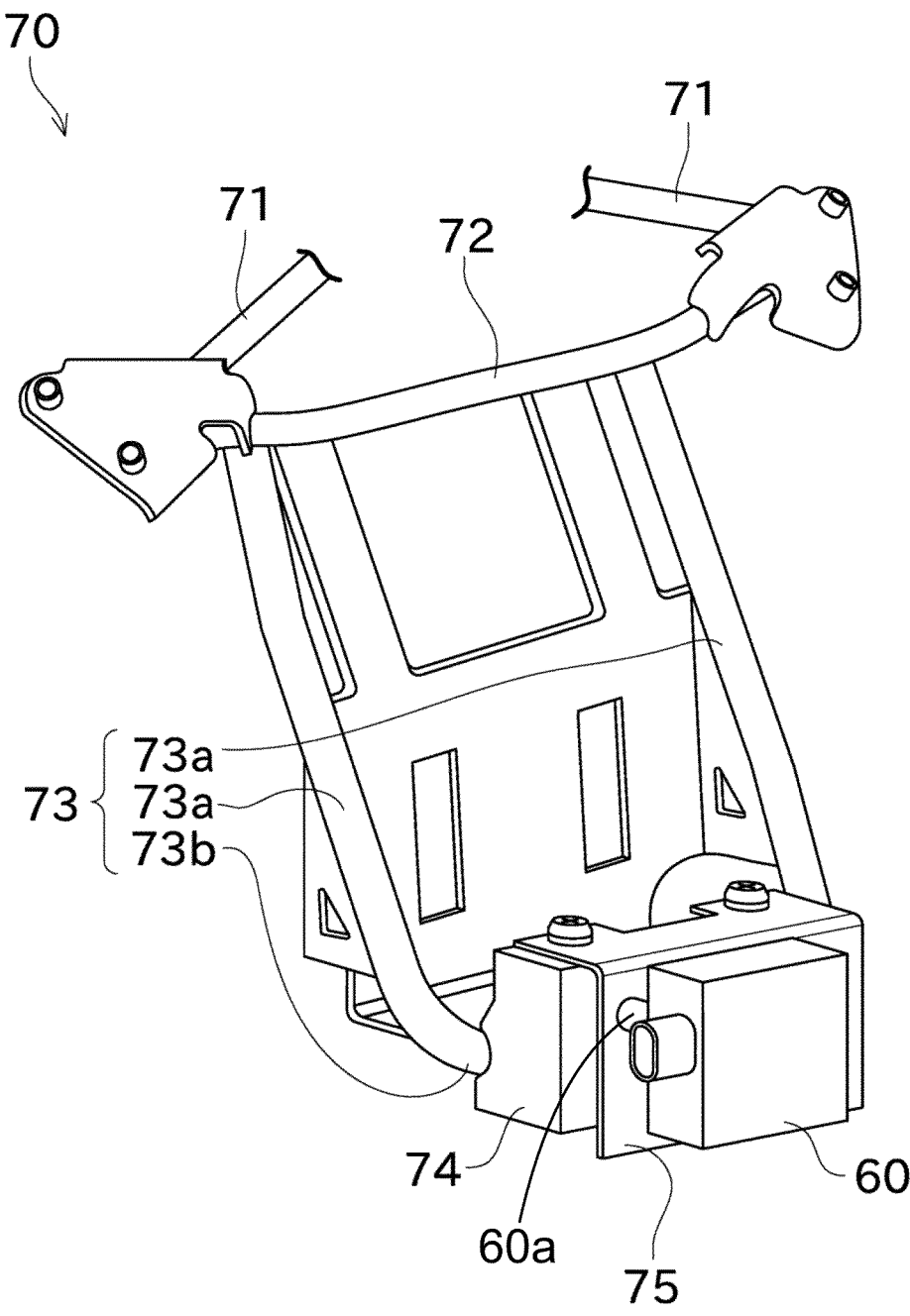
FIG. 3 is a perspective view of a mounting mechanism for a radar device.

Next, a mounting mechanism 70 of the radar device 60 is described with reference to FIG. 3. FIG. 3 is a perspective view of the mounting mechanism 70 of the radar device 60.

The radar device 60 is attached to the vehicle body frame 10 via the mounting mechanism 70. The mounting mechanism 70 is arranged in the front part of the vehicle body 2, in particular within the front cowling 22. The mounting mechanism 70 comprises a bifurcated frame 71, a front frame 72, a suspension frame 73, a radar stay 74 and a radar bracket 75.

The bifurcated frame 71 includes a pair of left and right rod-shaped frames arranged to extend in the vehicle width direction. The bifurcated frame 71 is connected to the vehicle body frame 10 directly or through another member. The bifurcated frame 71 according to this embodiment is connected to the head pipe, but may also be connected to another section.

The front frame 72 is a bar-shaped frame. The front frame 72 is oriented so that the longitudinal direction of the front frame 72 is the same as the vehicle width direction. The bifurcated frame 71 is connected to the front frame 72 as a left-right pair.

The suspension frame 73 is a substantially U-shaped rod-like frame and includes a left-right pair of straight sections 73*a* and a curved section 73*b*. One end of each of the left-right pair of straight sections 73*a* is connected to the front frame 72. The other end of the left-right pair of straight sections 73*a* is connected to the curved section 73*b*.

The radar stay 74 is an element for fixing the radar device 60. The radar stay 74 is connected to the curved section 73*b* of the suspension frame 73. The radar bracket 75 is fixed to the radar stay 74 with a fixing member such as a screw. The radar bracket 75 is formed with a fixing hole or the like, in which the radar device 60 can be fixed. The radar device 60 is fixed to the radar bracket 75 with a fixing member such as a screw. Thus, the radar device 60 is supported by a metal frame connected to the vehicle body frame 10.

Figure 4:
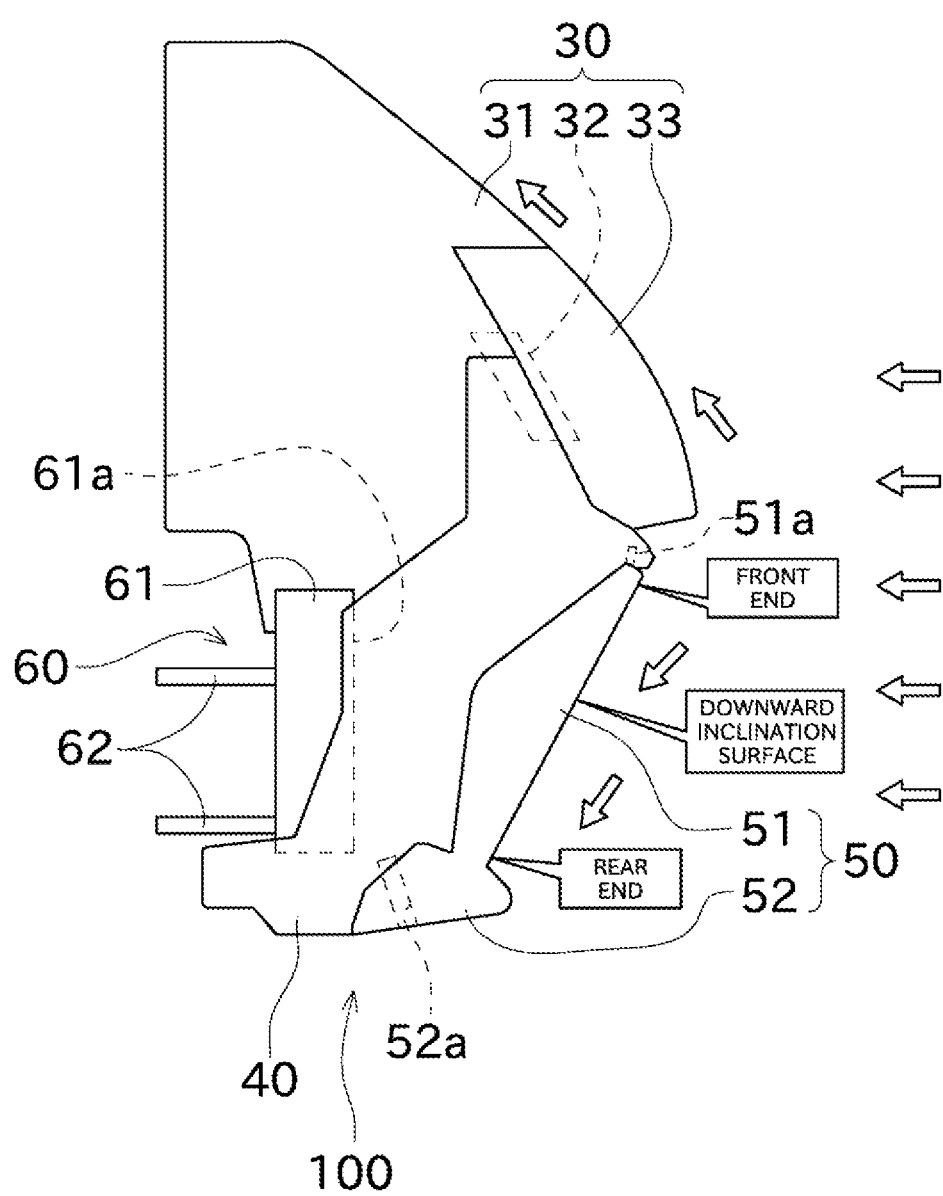
FIG. 4 is a side view of a headlight, a cover bracket, a radar cover, and the radar device.
Figure 5:
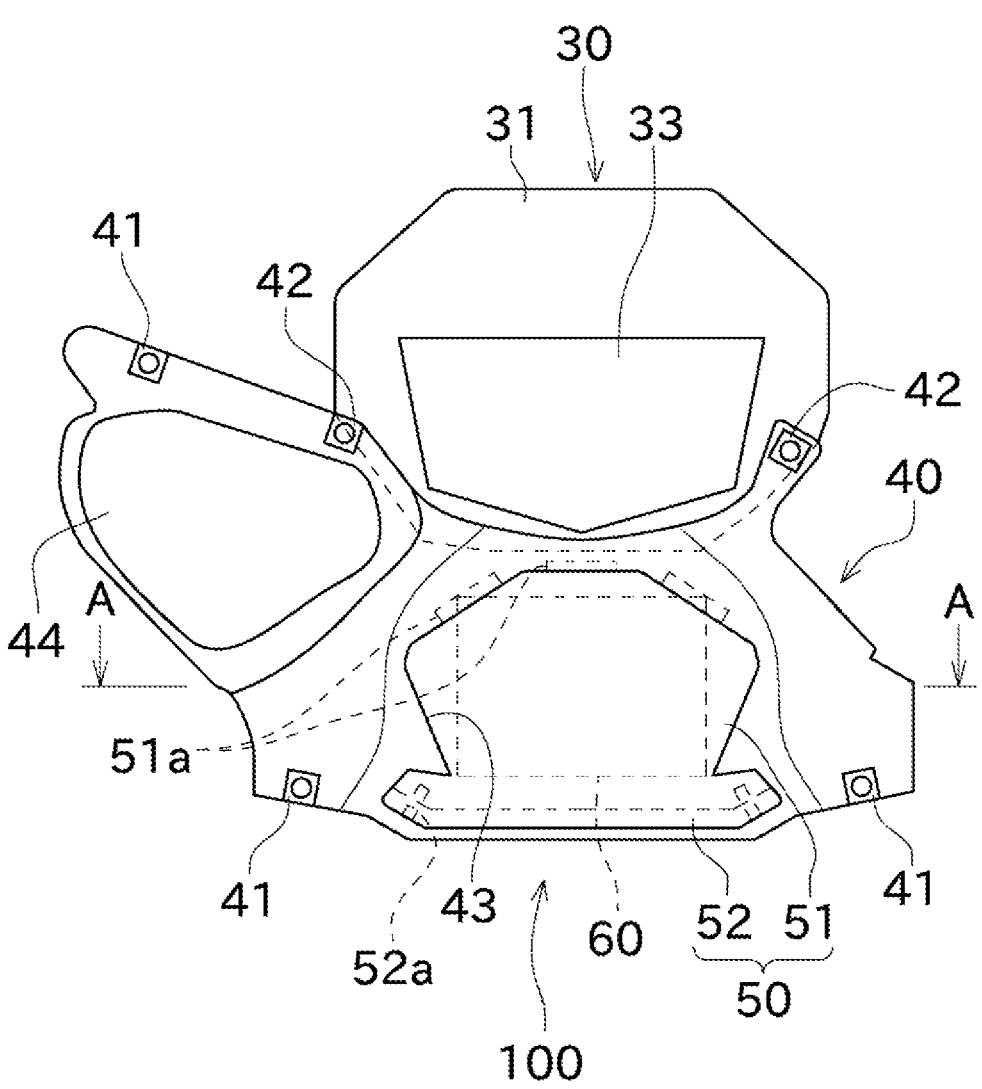
FIG. 5 is a front view of the headlamp, the cover bracket, the radar cover, and the radar device.
Figure 6:
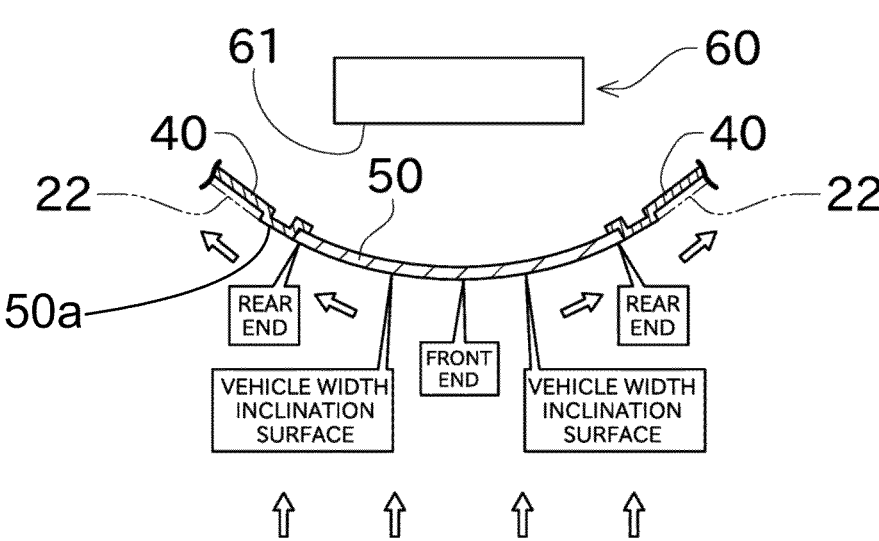
FIG. 6 is a cross-sectional view along line A-A in FIG. 5.

Next, the headlight 30, the cover bracket 40, the radar cover 50, and the radar device 60 are described with reference to FIG. 4 through FIG. 6. FIG. 4 is a side view of the headlight 30, the cover bracket 40, the radar cover 50, and the radar device 60. FIG. 5 is a front view of the headlight 30, the cover bracket 40, the radar cover 50, and the radar device 60. FIG. 6 is a cross-sectional view along line A-A in FIG. 5.

The headlight 30 according to this embodiment is a projection type lamp and includes a housing 31, a light source 32, and a lens 33. The housing 31 includes a structure for mounting the headlight 30 to the vehicle body frame 10. The light source 32 is arranged inside the housing 31. The light source 32 is a light emitting diode (LED). Further, the lens 33 includes a projection lens and a protective lens forming an outer lens. The projection lens refracts light emitted from the light source 32 to emit light into a predetermined illumination area. The protective lens is arranged outside the projection lens, particularly in front of the projection lens, and protects the projection lens, the light source 32 and the like from water, dirt and the like.

It should be noted that the light source 32 of the headlight 30 is not limited to the light emitting diode and may also be an incandescent lamp, a halogen lamp, or a high intensity discharge (HID) lamp. However, by making the light source 32 a light emitting diode, the light source 32 can be made smaller than in the case of an incandescent lamp, and thus the free space within the front cowling 22 can be increased. Furthermore, since the light emitting diode has a low heat generation, it can be placed comparatively close even to heat-sensitive components, thereby improving the degree of freedom in the design of the arrangement of electrical components within the front cowling 22.

Furthermore, since the headlight 30 is a projection type lamp, the headlight 30 can be reduced in size compared to a reflective headlight since no reflector is required. Therefore, the free space within the front cowling 22 can be further increased. It should be noted that the headlight 30 is not limited to the projection type headlight, and the headlight 30 may be, for example, a reflection type headlight having a structure in which a plurality of reflectors are arranged behind a light source and the light reflected from the reflectors is emitted forward.

Furthermore, since the headlight 30 according to this embodiment is a single-lamp headlight arranged only at the center position in the vehicle width direction, the free space inside the front cowling 22 can be increased at end portions in the vehicle width direction compared to a multi-lamp headlight. Using this free space, for example, a duct is arranged to supply air sucked from the engine air intake port 22*a* to the engine 11.

The cover bracket 40 is an element for attaching the radar cover 50 to the front cowling 22. In other words, the radar cover 50 is attached to the front cowling 22 via the cover bracket 40. The cover bracket 40 is a plate-shaped member configured with bumps, bends, or the like. The cover bracket 40 includes a first fixing portion 41, a second fixing portion 42, a cover attaching hole 43, and a closing portion 44.

The first fixing section 41 and the second fixing section 42 are sections for fixing the cover bracket 40. The first fixing section 41 and the second fixing section 42 include fixing holes for fixing the cover bracket 40. The first fixing section 41 is a section for fixing the cover bracket 40 to the front cowling 22. In particular, the cover bracket 40 is fixed to the front cowling 22 by aligning the holes of the front cowling 22 with the fixing holes of the first fixing section 41 and inserting the fixing member into the holes. The second fixing section 42 is a section for fixing the cover bracket 40 to the housing 31 of the headlight 30. In particular, the cover bracket 40 is fixed to the housing 31 by aligning the holes of the housing 31 with the fixing holes of the second fixing section 42 and inserting the fixing member into the holes. It should be noted that the cover bracket 40 and the headlight 30 can be fixed together to the front cowling 22 using the second fixing section 42.

The cover attaching hole 43 is a portion for fixing the radar cover 50. The cover attaching hole 43 is a through hole having a shape corresponding to the radar cover 50, and the radar cover 50 is mounted so as to close the cover attaching hole 43. The mounting structure of the radar cover 50 will be described later.

The closing portion 44 closes the dummy hole 22*b* described above. The closing section 44 has a shape corresponding to the dummy hole 22*b*. By fixing the cover bracket 40 to the front cowling 22, the positions of the closing section 44 and the dummy hole 22*b* are made to coincide. Since the cover bracket 40 includes the closing section 44, the number of components can be reduced. However, the closing portion 44 is not an integral part of the cover bracket 40. That is, a closing member for closing the lamp hole 22c may be arranged as a separate member from the cover bracket 40.

The radar device 60 includes a main body section 61 and a matching section 62. The main body section 61 has a cuboid-shaped housing and a module for transmitting and receiving electromagnetic waves incorporated in the housing. In this specification, a rectangular parallelepiped shape may be substantially a rectangular parallelepiped, and it is not required that each face be strictly rectangular.

The radar device 60 radiates electromagnetic waves from a front surface of the main body section 61. Therefore, the front surface of the main body section 61 forms a signal surface 61a. Specifically, the radar device 60 emits electromagnetic waves from a part of the front surface of the main body section 61, such as a central portion. Therefore, a part of the front surface of the main body section 61 forms the signal surface 61a. A reflected wave is received from the signal surface 61a. The matching section 62 is a mechanism that adjusts the direction in which electromagnetic waves are emitted. In particular, the adjusting section 62 can adjust the orientation of the mounting of the radar device 60 with respect to the radar bracket 75.

The radar cover 50 is an element that covers the signal surface 61a of the radar device 60. Covering the signal surface 61a means that the radar cover 50 is positioned in front of the signal surface 61a, and the radar cover 50 completely overlaps the signal surface 61a when viewed from the front.

The radar cover 50 is made of a permeable material through which electromagnetic waves emitted and received by the radar device 60 can pass. For example, the material of the radar cover 50 is ABS resin, but may be another resin. Furthermore, to suppress the influence of the radar cover 50 on electromagnetic waves, the thickness of the radar cover 50 is prevented from changing when the radar cover 50 moves in a direction intersecting the longitudinal axis, and in this embodiment, the thickness is constant. The radar cover 50 is formed in a curved surface shape that projects forward in the vehicle width direction, and is prevented from assuming a linearly curved shape. As a result, variations in the transmission and reception conditions for electromagnetic waves in the respective irradiation area are suppressed, and thus the radar device 60 can suitably transmit and receive electromagnetic waves through the radar cover 50. In addition, the electromagnetic waves emitted from the radar device 60 propagate in the up-down direction and the vehicle width direction, and electromagnetic waves in a predetermined irradiation area are used to detect a front area. In this embodiment, the positions and shapes of the radar cover 50 and the radar device 60 are selected so that all electromagnetic waves in the predetermined irradiation range pass through the radar cover 50. In particular, the radar cover 50 and the radar device 60 are arranged with a space therebetween in the front-rear direction. Furthermore, when viewed from the front, the area of the radar cover 50 is larger than the area of the signal surface 61a. The area when viewed from the front refers specifically to a projected area. More specifically, the width dimension and the dimension in the up-down direction of the radar cover 50 are selected so that an outer edge of an irradiation area of electromagnetic waves of the radar device 60 can pass through the radar cover 50.

Therefore, when selecting materials for elements other than the radar cover 50, such as the front cowling 22 and the cover bracket 40, materials can be selected without having to consider their influence on electromagnetic waves. For example, a different material may be selected for the cover bracket 40 than for the front cowling 22 or the cover bracket 40. Furthermore, it is not necessary that the thickness of the front cowling 22 or the cover bracket 40 be constant. That is, the thickness of the front cowling 22 or the cover bracket 40 may be different from the thickness of the radar cover 50. For example, the radar cover 50 may be thinner than the front cowling 22. Further, the minimum radius of curvature of the radar cover 50 may be larger than the minimum radius of curvature of the front cowling 22. The radar cover 50 may be made of a material that has higher electromagnetic wave transmission than the front cowling 22.

The radar cover 50 includes a cover section 51 and a fixing section 52. The cover section 51 is a section that covers the signal surface 61a. The cover section 51 of this embodiment has a polygonal shape when viewed from the front. However, the shape of the covering section 51 when viewed from the front is not limited to the polygonal shape. The fixing section 52 is connected to a lower portion of the cover section 51. The fixing section 52, when viewed from the front, is longer than a lower end of the cover section 51 in the vehicle width direction. Further, the fixing section 52 is a portion that slightly protrudes forward.

The radar cover 50 has projections 51a and fixing holes 52a as portions for fixing the radar cover 50 to the cover bracket 40. The projections 51a project further upward from an upper end of the cover section 51. The fixing holes 52a are through-holes penetrating the fixing section 52 substantially in the up-down direction.

When fixing the radar cover 50, an operator fits the radar cover 50 into the cover attaching hole 43 of the cover bracket 40. At this time, the protrusion 51a of the radar cover 50 enters a groove on the edge of the upper side of the cover attaching hole 43. Then, the operator aligns the fixing holes 52a with holes on the side of the cover bracket 40 and inserts a fixing member to fix the radar cover 50 to the cover bracket 40. This secures the radar cover 50 to the front cowling 22 via the cover bracket 40.

Furthermore, the radar cover 50 can be removed from the cover bracket 40 by removing the fixing member. That is, the radar cover 50 is detachable from the cover bracket 40, in other words, the radar cover 50 is detachable from the front cowling 22.

That is, the radar cover 50 is attached to the front cowling 22 corresponding to the first attachment portion 50a, while the radar device 60 is attached to the mounting mechanism 70 corresponding to the second attachment portion 60a. The front cowling 22 and the mounting mechanism 70 are different elements. Therefore, the radar cover 50 and the radar device 60 can be removed separately. As a result, it is not necessary to remove the radar device 60 when the radar cover 50 is removed for cleaning or replacement, for example. Consequently, the orientation of the radar device 60 is less likely to shift when the radar cover 50 is attached and removed. In particular, when the radar device 60 includes the adjustment section 62, as in this embodiment, it is generally not necessary to readjust the orientation of the radar device 60 when the radar cover 50 is attached and detached.

In this embodiment, the radar cover 50 is attached to the front cowling 22 via the cover bracket 40. Even if the radar cover 50 is attached to the front cowling 22 via another element, the present description assumes that the radar cover

50 is attached to the front cowling 22. Furthermore, the radar cover 50 may be directly attached to the front cowling 22.

Next, an inclined surface of the radar cover 50 is described.

As shown in FIG. 4, the radar cover 50 has a downward inclination surface. The downward inclination surface is inclined such that a rear end position moves downwardly away from a front end position. In other words, the downward inclination surface is a surface that is inclined downwardly toward the rear. In this embodiment, the entire outer surface of the cover section 51 forms the downward inclination surface. However, only a portion of the outer surface of the cover section 51 may form the downward inclination surface.

An inclination angle of the downward inclination surface may be constant or the angle of inclination may be changed one or serval times. Alternatively, the angle of inclination of the downward inclination surface may change gradually, that is, the downward inclination surface may be curved. Thus, in the present description, the concept of inclination of the downward inclination surface includes curvature. Similarly, the concept of inclination of a vehicle width inclination surface described later includes curvature. When the inclined surface is curved, the radius of curvature of a central portion in the vehicle width direction is preferably larger than the radius of curvature of an outer portion in the vehicle width direction.

Since the radar cover 50 has the downward inclination surface, the traveling air shown by the arrows in FIG. 4 is uniformly deflected rearward at an inclination angle when it strikes the downward inclination surface. As a result, air resistance can be reduced. In addition, a portion of the traveling air diverted by the downward inclination surface flows rearwardly between the lower side of the front cowling 22 and the front fender 14, and is thus directed to the radiator 16. The amount of traveling air directed to the radiator 16 can thus be increased, making it possible to improve the heat dissipation efficiency of the radiator 16. Therefore, the downward inclination surface corresponds to a guide surface that guides the traveling air to the radiator air intake port 19, which forms one of the air intake ports.

As shown in FIG. 6, the radar cover 50 includes a vehicle width inclination surface. The vehicle width inclination surface is inclined such that rear end positions move outward in the vehicle width direction away from a front end position. In other words, the vehicle width inclination surface is a surface inclined outwardly toward the rear in the vehicle width direction. In this embodiment, the entire outer surface of the radar cover 50 forms the vehicle width inclination surface. However, only a part of the outer surface of the radar cover 50 may form the area inclined to the vehicle width.

Since the radar cover 50 has the vehicle width inclination surface, the traveling air shown by the arrows in FIG. 6 is uniformly deflected outward in the vehicle width direction when it strikes the vehicle width inclination surface. As a result, air resistance can be reduced. Moreover, as shown in FIG. 2, the position of the radar cover 50 in the height direction overlaps with the position of the engine air intake port 22*a* in the height direction. Therefore, a portion of the traveling air directed to a side in the vehicle width direction by the vehicle width inclination surface is directed to the engine air intake port 22*a*. Consequently, the intake amount of air drawn in by the engine 11 can be increased. Therefore, the vehicle width inclination surface corresponds to a guide surface that guides the traveling air to the engine air intake port 22*a*, which forms one of the air intake ports.

The vehicle width inclination surface of this embodiment is located on the left and right sides and is curved. In other words, the vehicle width inclination surface is an arc-shaped surface. As a result, the traveling air can be uniformly discharged outward in the vehicle width direction. Furthermore, in this embodiment, the surface of the radar cover 50 inclined to the vehicle width, the front surface of the cover bracket 40, and the front surface of the front cowling 22 are connected without steps. In particular, the cover bracket 40 includes a protruding section protruding forwardly, and the radar cover 50 and the front cowling 22 are arranged to enclose the protruding section. Further, the connection without steps means that the heights of the surfaces at the boundaries between the elements are matched to some extent and there are no large step differences.

Since the radar cover 50, the cover bracket 40, and the front cowling 22 are connected without steps, the traveling air can be dissipated more uniformly. Instead of the structure of this embodiment, only the radar cover 50 and the cover bracket 40 can also be connected without steps, or only the cover bracket 40 and the front cowling 22 can be connected without steps. If the cover bracket 40 is not provided or the cover bracket 40 does not appear on the front surface of the vehicle body 2, the radar cover 50 and the front cowling 22 may be connected without steps.

Next, a positional relationship between the radar cover 50 and the headlight 30 is described.

As shown in FIG. 4, the front end of the vehicle body 2 has a shape that projects forward, in other words, a tapering shape. The headlight 30 is accommodated in an upper gap at the front end of the front cowling 22 of the vehicle body 2. Further, the radar cover 50 is accommodated in a lower intermediate space at the front end of the front cowling 22 of the vehicle body 2. In other words, by the headlight 30 and the radar cover 50, a shape is formed which protrudes forward. Furthermore, since the headlight 30 is formed with a downward inclination surface, similar to the radar cover 50, the traveling air incident on the headlight 30 can be deflected upwardly to reduce air resistance.

Also, the front end of the headlight 30 is positioned in front of the front end of the radar cover 50. As a result, rainwater splashing onto the headlight 30 is favored to drain along the headlight 30 and fall downward from the front end of the headlight 30. That is, rainwater hardly splashes onto the radar cover 50. It should be noted that a longitudinal position of the front end of the headlight 30 and a longitudinal position of the front end of the radar cover 50 may coincide.

Furthermore, in this embodiment, the signal surface 61*a* of the radar device 60 is arranged behind the front surface of the headlight 30. As a result, the front end of the vehicle body 2 can be made smaller than in the case of a structure in which the longitudinal position of the front surface of the headlight 30 and the longitudinal position of the signal surface 61*a* of the radar device 60 are aligned. This allows for the a reduction of air resistance. In addition, the headlight 30 and the radar device 60 are preferably arranged as far forward as possible so that other elements are not disturbed by light or electromagnetic waves. Therefore, the radar device 60 is arranged relatively far forward, and in particular is arranged so that the signal surface 61*a* is arranged in front of the rear surface of the housing 31 of the headlight 30. As a result, the headlight 30 is less likely to be disturbed by electromagnetic waves propagating upward and downward.

As explained above, the motorcycle 1 of this embodiment includes the radar device 60 and the radar cover 50. The radar device 60 is arranged lower than a front end portion of the vehicle body 2. The radar device 60 has the signal surface 61*a* for wirelessly transmitting signals to a front area or wirelessly receiving signals from the front area, and detects the front area in front of the vehicle. The radar cover 50 covers at least the signal surface 61*a*.

As a result, there is no need to arrange the radar device 60 in an area above the front end portion of the front cowling 22, and restrictions on the design of the outer shape of the cowling from the front end portion to the upper end portion of the front cowling 22 can be reduced. That is, it is possible to suppress a reduction in the degree of freedom in designing the outer shape of the motorcycle 1 according to this embodiment. For example, an outer shape in an upward direction and the vehicle width direction from the front end to the rear can be approximated to a streamlined shape, whereby the outer shape can be more easily approximated to a shape that reduces air resistance during driving. Moreover, by reducing the bulge at the inclination from the front end portion of the front cowling 22 to the upper end portion of the front cowling 22, the outer shape of the front cowling 22 can be easily made in a small size, and it is easy to design the shape according to the rider's preference. Further, an arrangement space in which the radar device 60 is arranged is formed behind and below the front end portion of the front cowling 22. Since the outer shape of the area behind the front end portion of the front cowling 22 gives a smaller impression on the appearance than the outer shape of the area above the front end portion of the front cowling 22, the influence on the rider's preferences is smaller.

The radar cover 50 is arranged in front of the signal surface 61*a* of the radar device 60. This prevents flying objects such as rainwater or mud thrown up by the road surface or wheels from adhering directly to the signal surface 61*a*. Since an operator does not touch the signal surface during operations to remove adhering material, the position of the signal surface aligned with the vehicle body can be prevented from shifting. In addition, the amount of rainwater adhering to or running off the signal surface 61*a* can be reduced compared to a surface disposed above the front end of the front cowling 22.

Furthermore, since the radar cover 50 covers the signal surface 61*a*, flying objects such as pebbles that approach the vehicle body from an area in front of the vehicle body while the vehicle is moving can be prevented from striking the signal surface 61*a* of the radar device 60. Thus, the radar device 60 can be protected from flying objects.

In the motorcycle 1 of this embodiment, the radar cover 50 includes a downward inclination surface. The downward inclination surface is inclined such that a rear end position is downwardly away from a front end position.

As a result, the traveling air impinging on the front end of the radar cover 50 is directed downwardly and rearwardly at an angle along the downward inclination surface, so that air resistance can be kept lower than when the radar cover 50 is arranged vertically with respect to the front-rear direction. As described above, the radar cover 50 may be inclined downward in its entirety, as in this embodiment, or may be partially inclined in the up-down direction. For example, a rear end portion of the radar cover 50 may be inclined. As described above, the radar cover 50 may be linearly inclined or have a curved inclination. Alternatively, the radar cover 50 may be stepped.

In the motorcycle 1 of this embodiment, the radar cover 50 includes a vehicle width inclination surface. The vehicle width inclination surface is inclined such that the rear end positions is outwardly away from a front end position in the vehicle width direction.

As a result, the traveling air impinging on the front end of the radar cover 50 is directed rearwardly and outwardly in the vehicle width direction along the vehicle width inclination surface, so that the air resistance can be kept lower than when the radar cover 50 is formed vertically to the front-rear direction. As described above, the radar cover 50 may be inclined in its entirety, as in this embodiment, or the radar cover 50 may be partially inclined in the vehicle width direction. For example, a portion of the radar cover 50 outer in the vehicle width direction may be inclined. The radar cover 50 may be linearly inclined, have a curved inclination, or be stepped.

The vehicle body 2 of the motorcycle 1 of this embodiment includes, adjacent to the radar cover 50, the engine air intake port 22*a* and the radiator air intake port 19 for admitting air into the interior of the vehicle body 2. The radar cover 50 has a guide surface for guiding traveling air to the engine air intake port 22*a* and the radiator air intake port 19.

In this embodiment, the inclined surface described above functions as part of the guide surface. In particular, the traveling air impinging on the radar cover 50 is directed to the radiator 16 arranged below the radar cover 50 through the downward inclination surface of the radar cover 50, which is inclined downwardly toward the rear of the radar cover 50. In addition, the traveling air incident on the radar cover 50 is directed to an engine intake pipe arranged on the left side of the radar cover 50 through the vehicle width inclination surface of the radar cover 50 inclined to the vehicle width, which is inclined outwardly toward the rear in the vehicle width direction.

Consequently, the traveling air impinging on the radar cover 50 is directed to the engine air intake port 22*a* so that the amount of air drawn in can be increased and the intake efficiency of the engine 11 can be improved. Further, since the traveling air incident on the radar cover 50 is directed to the radiator air intake port 19, the cooling effect of the radiator 16 can be improved.

The vehicle body 2 of the motorcycle 1 of this embodiment includes the headlight 30 which is arranged above the radar cover 50. The headlight 30 is in the form of a protruding section that protrudes forward beyond a front end of the radar cover 50.

As a result, rainwater that impinges on the upper surface of the headlight 30 configured as a protruding section and flows forward along the upper surface of the headlight 30 is favored to fall downward from the front end of the headlight 30 without flowing through the radar cover 50. Consequently, rainwater flowing along the vehicle body 2 is less likely to flow into the radar cover 50.

The motorcycle 1 of this embodiment includes the front cowling 22, which forms a front portion of the vehicle body 2. The radar cover 50 is detachable from the front cowling 22.

This allows the radar cover 50 to be removed without removing the front cowling 22. Thus, the radar cover 50 can be washed in a simple manner on its own. It is equally possible to replace the radar cover 50 in a simple manner. For example, if mud, insects, or the like adhere to the radar cover 50, the radar cover 50 can be removed from the front cowling 22 for cleaning so that the radar cover 50 can be easily cleaned. In addition, the radar cover 50 may be damaged due to a collision with a pebble or the like, and the transmission of electromagnetic waves may be reduced. In this embodiment, it is possible to avert deterioration of the transmissivity of the radar cover 50 by merely replacing the radar cover 50.

The motorcycle 1 of this embodiment includes the front cowling 22 and the mounting mechanism 70. The radar cover 50 can be attached to the front cowling 22. The radar device 60 can be attached to the mounting mechanism 70. The front cowling 22 and the mounting mechanism 70 are different elements.

As a result, when the radar cover 50 is attached and removed, any influence on the attachment position of the radar device 60 is minimized. In particular, in this embodiment, the suspension frame 73 and the radar stay 74 to which the radar device 60 is attached are elements that are closer to the vehicle body frame 10 than the front cowling 22 to which the radar cover 50 is attached. Therefore, it is easy to stabilize the mounting position of the radar device 60. Further, since the suspension frame 73 and the radar stay 74 are made of metal, they have higher strength than the front cowling 22 made of resin. From this point of view, it is also easy to stabilize the mounting position of the radar device 60.

In the motorcycle 1 of this embodiment, the radar cover 50 is made of a different material from the front cowling 22, or has a different thickness from the front cowling 22.

Thus, it is possible to select a material and thickness for the radar cover 50 that correspond to desired functions. In particular, the radar cover 50 has a higher transmissivity for electromagnetic waves transmitted and received by the radar device 60 compared to the front cowling 22. In particular, the radar cover 50 is formed in a low thickness, or is made of a material having a high transmissivity for electromagnetic waves. By separating the structure and materials required for the front cowling 22 and the structure and materials required for the radar cover 50 in this manner, the degree of freedom in material selection can be increased compared to a case where a single structure or material is used with the functions of a front cowling and a radar cover.

The motorcycle 1 of this embodiment includes the headlight 30, which is arranged centrally in the vehicle width direction and illuminates forward. The radar device 60 is arranged below the headlight 30.

As a result, relative to each other, the headlight 30 is arranged at the top and the radar device 60 is arranged at the bottom in the front area of the vehicle body 2. That is, since the front area of the vehicle body 2 can be used advantageously, the radar device 60 and the headlight 30 can be arranged relatively far forward. Further, by arranging both the radar device 60 and the headlight 30 in the middle in the vehicle width direction, it is possible to provide a space in an end portion in the vehicle width direction.

In the motorcycle 1 of this embodiment, the signal surface 61*a* of the radar device 60 is arranged rearward the front surface of the headlight 30.

For example, in a conventional motorcycle that does not have a radar cover, if the front surface of the headlight and the signal surface of the radar device have the same longitudinal position, the limitation arises that the inclination angle of the signal surface cannot be increased, and thus the size of the front end portion of the vehicle body increases slightly. As a result, the air resistance of the motorcycle increases while driving. On the other hand, since the motorcycle 1 of this embodiment includes the radar cover 50, the signal surface 61*a* may be disposed behind the front surface of the headlight 30. Since the front surface of the radar cover 50 has no or few restrictions compared to the signal surface 61*a*, the front end portion of the vehicle body 2 can be made small in size. Thus, the air resistance of the motorcycle 1 can be reduced while driving.

Preferred embodiments of the present application have hereby been explained. However, the structure described above may be modified, for example, as described below.

Although the cover bracket 40 and the radar cover 50 in the above embodiment are separate elements, the cover bracket 40 and the radar cover 50 may be integrally formed. Furthermore, the front cowling 22 may perform a function of the cover bracket 40 or the radar cover 50 of the above embodiment.

In the embodiment described above, the signal surface 61*a* of the radar device 60 is arranged substantially vertically, but the signal surface 61*a* may also be arranged inclined forwardly or rearwardly.

A detecting device is not limited to the radar device 60. For example, a sonar device that detects a front area by transmitting and receiving ultrasonic waves can be used as a detecting device. In this case, the transmitted and received ultrasonic waves correspond to signals. A camera that captures an image of the front area can also be used as the detecting device. In this case, the signal consists of visible light that is generated when external light, such as sunlight, is reflected from an object. Furthermore, the signal surface 61*a* may also perform only one operation of signal transmission and signal reception. When a camera is used as a detecting device, the signal surface 61*a* is used only for receiving signals. When a transmitting device for transmitting signals and a receiving device for receiving signals are separate units, a signal surface of the transmitting device is used exclusively for transmitting signals.

In the embodiment described above, the traveling air received through the inlet port is directed to the engine 11 or the radiator 16. Instead of that, the traveling air may be directed to other heat generating components. For example, other heat generating components include components disposed within the cowling 20, such as a regulator or a radiator for an electric motor.

The cowling 20 is not an essential component and may be partially or completely omitted. For example, the radar cover 50 of this embodiment may also be provided on a naked type (standard type) motorcycle. For example, in the naked type motorcycle 1, a headlight unit corresponds to the front end portion of the vehicle body. By arranging the radar device 60 below the headlight unit and providing the radar cover 50 to cover the radar device 60, at least part of the effect of this embodiment can be achieved.

Although the motorcycle 1 in the above embodiment has been described as an example of a straddle vehicle, a similar technique may be applied to other straddle vehicles. Examples of other straddle vehicles include vehicles having two front wheels and one rear wheel, vehicles having one front wheel and two rear wheels, and vehicles having two front wheels and two rear wheels. Examples of four-wheeled motor vehicles include, for example, an all-terrain vehicle for driving on unpaved ground.

What is claimed is:

1. A straddle vehicle, comprising:
   a detecting device arranged within a vehicle body, the detecting device having a signal surface configured to wirelessly transmit a signal to a front area or to wirelessly receive the signal from the front area, the detecting device detecting the front area;
   a cover covering at least the signal surface; and
   a front cowling forming a front portion of the vehicle body, wherein the cover includes a downward inclination surface, the downward inclination surface being inclined such that a rear end position is downwardly away from a front end position, wherein an upper end of the detecting device is positioned below a front end portion of the front cowling, wherein the upper end of the detecting device is positioned lower than a front end of the vehicle body, wherein the cover is separate from the front cowling and is detachable, wherein the front end of the vehicle body is arranged so as to overlap with a center position in a vehicle width direction, wherein the cover is arranged so as to overlap with the center position in the vehicle width direction, wherein the vehicle body is provided with an inlet port for admitting traveling air, located below and rearward of the cover, and wherein the downward inclination surface of the cover guides the traveling air to the inlet port.

2. The straddle vehicle according to claim 1, wherein the cover includes a vehicle width inclination surface, the vehicle width inclination surface being inclined such that the rear end position is outwardly away from the front end position in a vehicle width direction.

3. The straddle vehicle according to claim 1, wherein an intake port is adjacent to the cover, the intake port configured to admit traveling air into an interior, the intake port being formed on the vehicle body and wherein the cover has a vehicle width inclination surface configured to guide the traveling air to the intake port.

4. The straddle vehicle according to claim 3, further comprising:

a radiator arranged rearward of the intake port, the radiator lowering a temperature of a circulating fluid by dissipating heat through air cooling.

5. The straddle vehicle according to claim 1, wherein a protruding section is arranged above the cover and formed on the vehicle body, the protruding section protruding forward beyond a front end of the cover.

6. The straddle vehicle according to claim 1, further comprising:

a first attachment portion, the cover being attached to the first attachment portion and a second attachment portion, the detecting device being attached to the second attachment portion, wherein the first attachment portion and the second attachment portion are different elements.

7. The straddle vehicle according to claim 1, wherein the cover has a higher transmissivity for the signal compared to the front cowling.

8. The straddle vehicle according to claim 1, further comprising:

a headlight arranged centrally in a vehicle width direction, the headlight illuminating forward, wherein the detecting device is arranged below the headlight.

9. The straddle vehicle according to claim 8, wherein the signal surface of the detecting device is arranged rearward of a front surface of the headlight.

10. The straddle vehicle according to claim 1, wherein the cover is thinner than the front cowling.

11. The straddle vehicle according to claim 1, wherein the detecting device detects an object by transmitting an electromagnetic wave to the front area, and receiving the electromagnetic wave reflected from the object present in the front area.

12. The straddle vehicle according to claim 1, wherein an entire outer surface of the cover is inclined such that the outer surface of the cover extends downwardly as the outer surface of the cover extends rearwardly.

13. The straddle vehicle according to claim 1, wherein an entire outer surface of the cover has a curved surface shape that extends rearwardly as the outer surface of the cover extends from a vehicle width inner side toward a vehicle width outer side.

14. The straddle vehicle according to claim 1, wherein a protruding section is formed above a front end of the cover, projecting forward.

15. The straddle vehicle according to claim 14, wherein the front end of the cover is positioned rearwardly away from the protruding section.

* * * * *